Figure 1:
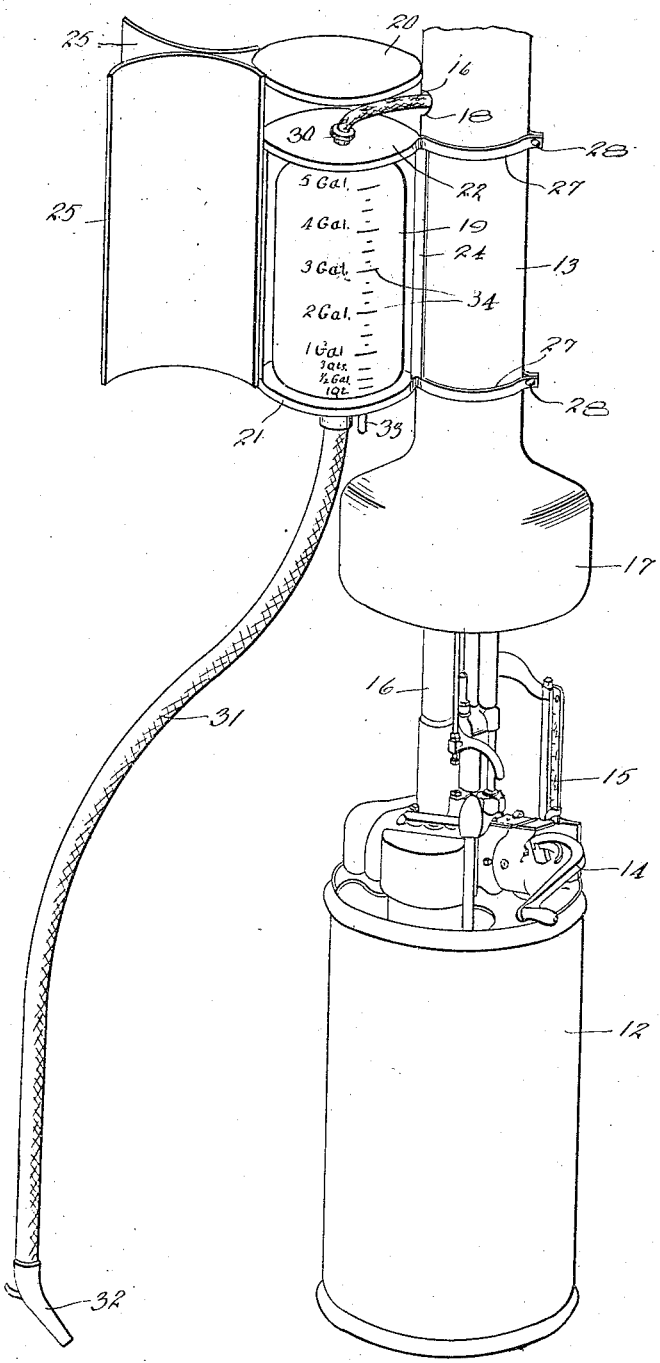

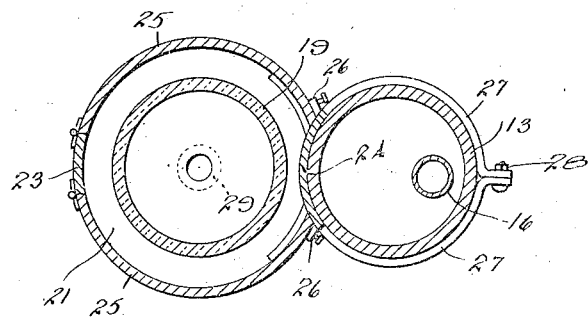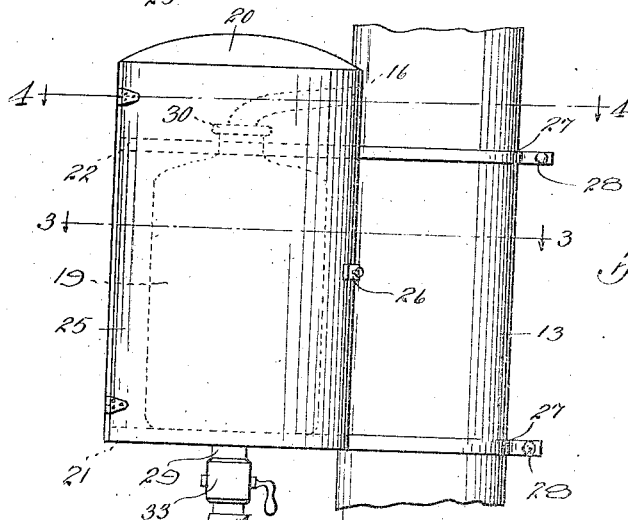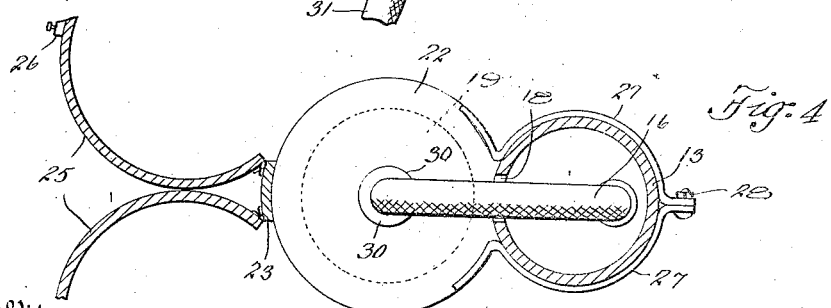

UNITED STATES PATENT OFFICE.

WILLIAM L. THAXTON, OF BALTIMORE, MARYLAND.

MEASURING-PUMP ATTACHMENT.

1,206,740.

Specification of Letters Patent.  Patented Nov. 28, 1916.

Application filed May 15, 1916.  Serial No. 97,554.

*To all whom it may concern:*

Be it known that I, WILLIAM L. THAXTON, a citizen of the United States, residing at Baltimore, in the State of Maryland, have invented or discovered certain new and useful Improvements in Measuring-Pump Attachments, of which the following is a specification, reference being had therein to the accompanying drawings.

This invention pertains to measuring and dispensing apparatus and relates more particularly to an attachment for measuring pumps for delivering predetermined quantities of liquid from a bulk supply.

Such apparatus is now extensively used in garages and similar establishments for the purpose of dispensing gasolene to motorists. As usually arranged the complete apparatus comprises a storage tank for gasolene, which, in accordance with the laws of most localities, is usually buried in the ground, and a measuring pump situated on the surface of the ground or floor and adapted, when properly adjusted and operated, to draw measured quantities of gasolene from the tank and to deliver the same, though a discharge pipe or hose, directly into the fuel tank of the vehicle. As the mechanism of the pump is usually inclosed within a casing, and as the gasolene is drawn from a hidden source and is delivered directly to the fuel tank without being seen, there is no way in which the customer can positively determine whether or not the pump is in perfect working order and is properly adjusted and operated. He is therefore forced to rely, to a certain extent, upon the care and honesty of the dealer. It is possible for unscrupulous dealers to take advantage of these conditions to cheat the purchaser, while, on the other hand, many careful and honest dealers are embarrassed by lack of confidence on the part of suspicious customers. Automatic measuring pumps are extremely convenient and highly efficient for the purposes above mentioned, and are constantly coming into more general use, and it is therefore very desirable, for the protection of both parties to every sale of gasolene, that means be provided whereby the customer can quickly and easily convince himself that he is receiving the exact quantity paid for.

The present invention accordingly has for its general object the provision of an attachment for measuring pumps, for dispensing measured quantities of liquid, which is readily applicable to existing pumps of this character, as usually constructed and arranged, which will not interfere with the normal operation of the pump, but will serve to check and visually indicate to the customer the quantities of liquid measured and delivered by the pump.

The foregoing and other more particular objects of the invention, together with means whereby the same may be carried into effect, will best be understood from the following description of one form and application thereof illustrated in the accompanying drawings. It will be understood, however, that the particular embodiment of the invention described and shown has been chosen for illustrative purposes merely, and that said invention, as defined by the claims hereunto appended, may be otherwise practised without departing from the spirit and scope thereof.

In said drawings: Figure 1 is a perspective view showing the device in use in connection with a measuring pump of well known form. Fig. 2 is an elevation of the attachment, showing the casing closed. Fig. 3 is a horizontal section on the line 3—3, Fig. 2. Fig. 4 is a section on the line 4—4, Fig. 2, showing the casing open.

The measuring pump shown in Fig. 1 is of a common type familir to those skilled in the art, and the pumping and measuring mechanism thereof is not illustrated in detail as specifically it forms no part of the present invention and is itself well known. Generally speaking, said pump comprises a casing 12, which houses the mechanism for drawing measured quantities of liquid from a buried storage tank (not shown) said casing being surmounted by a hollow upright or lamp post 13. The pumping and measuring mechanism is operated by a crank or handle 14, the quantities being indicated on a rack scale 15, and the liquid being delivered through a discharge pipe 16 which, in order to secure a sufficient head to enable the gasolene to run by gravity into the fuel tank of the vehicle, is extended upwardly into the upright 13.

As apparatus of this character is usually arranged, the discharge pipe or hose 16, after being carried upwardly a suitable distance within the upright 13, is brought downwardly again also within said upright and outwardly beneath the hood 17 at the lower end thereof. In accordance with the present invention, however, said discharge pipe is led outwardly through an opening 18, tapped or cut in the wall of the upright 13, and connected to a checking and measuring vessel 19 composed of glass or other transparent material, and provided with suitable graduations 34.

The measuring vessel 19 is supported and inclosed by a casing comprising a top member 20, a bottom member 21, an intermediate member 22, an upright 23 (see Figs. 3 and 4) connecting the members 20, 21, and 22, an upright 24 connecting the members 21 and 22 and fitting the exterior of the pump upright 13, and a pair of doors 25 hinged to the upright 23 and provided with latches or locks 26 coöperating with the upright 24. Said casing is attached to the exterior of the pump upright 13 by means of clamps 27, carried by the members 21 and 22, embracing the upright 13, and secured in position thereabout by means of bolts 28. The members 21 and 22 are provided with substantially central openings to receive lower and upper nipples 29 and 30 on the vessel 19, to the latter of which is connected the discharge pipe 16, and to the former of which is connected a delivery pipe or hose 31 provided at its end with a delivery nozzle 32 and controlled by a valve 33 (see Fig. 2) located immediately adjacent the nipple 29 at the bottom of the casing. The doors 25 are arranged at opposite sides of the casing, and when closed serve completely to inclose, protect, and conceal the measuring vessel, but when open expose said vessel at opposite sides, permitting the customer or other observer to see completely through the same.

In use the doors 25 are opened, the valve 33 closed, and the measuring pump operated in the usual manner to discharge a predetermined quantity of gasolene through the pipe 16. Said gasolene, however, instead of being delivered directly to the fuel tank, is discharged into the measuring vessel 19, where its volume may be readily observed and checked. Thereafter the valve 33 is opened and the gasolene allowed to run from the vessel 19 through the delivery hose 31 to the fuel tank in the usual manner.

It will, of course, be understood that the measuring vessel 19 is not intended to take the place of the measuring mechanism of the pump, but is merely designed to indicate visually the correctness of the quantities delivered by the latter. The numerous conveniences and advantages of the measuring pump mechanism, including the ability to keep, automatically, an inventory of the gasolene sold, are therefore retained, while the customer is enabled to convince himself of the accuracy of the operation of the pump, to the mutual protection of both himself and the dealer. Moreover it will be seen that the two measuring devices, being wholly independent of one another in operation, serve as a check upon each other.

Having thus described my invention, I claim:—

1. An attachment for measuring pumps of the type comprising an upright or post and an upwardly directed discharge pipe supported by said post, said attachment comprising a casing having means for securing the same to said post, a graduated measuring vessel within said casing and adapted to receive liquid from said discharge pipe, and a valve controlled delivery pipe leading from said vessel and casing.

2. An attachment for measuring pumps comprising a casing provided with means for securing the same to the pump upright, a transparent measuring vessel within said casing and arranged to receive the discharge from the pump, and a valve controlled delivery pipe leading from the bottom of said vessel and casing, said casing being provided with doors for closing the opposite sides thereof but adapted to be opened to expose the opposite sides of said vessel.

3. An apparatus of the character described, comprising a measuring force pump having a hollow post extending upwardly therefrom and provided with a lateral opening and an upwardly directed discharge pipe within said post and extending through said opening, said pump being adapted to force measured quantities of liquid through said discharge pipe, a graduated measuring vessel secured to the exterior of said post and with which said discharge pipe communicates, and a valve controlled delivery pipe leading from said vessel.

In testimony whereof I affix my signature.

WILLIAM L. THAXTON.